United States Patent
McFarland et al.

(10) Patent No.: US 10,677,138 B2
(45) Date of Patent: Jun. 9, 2020

(54) HEAT SHIELD AND GASKET FOR REDUCTANT DELIVERY UNIT

(71) Applicant: Continental Automotive Systems, Inc., Auburn Hills, MI (US)

(72) Inventors: Robert Wayne McFarland, Smithfield, VA (US); Keith Aaron Shaw, Yorktown, VA (US); Christopher Michael Caulkins, Virginia Beach, VA (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 0 days.

(21) Appl. No.: 15/934,132

(22) Filed: Mar. 23, 2018

(65) Prior Publication Data

US 2019/0292971 A1 Sep. 26, 2019

(51) Int. Cl.
*F01N 13/08* (2010.01)
*F01N 3/04* (2006.01)
*F01N 3/20* (2006.01)
*F01N 13/18* (2010.01)

(52) U.S. Cl.
CPC ............. *F01N 13/08* (2013.01); *F01N 3/046* (2013.01); *F01N 3/2066* (2013.01); *F01N 13/1827* (2013.01); *F01N 2240/20* (2013.01); *F01N 2260/024* (2013.01); *F01N 2260/20* (2013.01); *F01N 2570/14* (2013.01); *F01N 2570/22* (2013.01); *F01N 2610/02* (2013.01);
(Continued)

(58) Field of Classification Search
CPC combination set(s) only.
See application file for complete search history.

(56) References Cited

U.S. PATENT DOCUMENTS 8,327,829 B2 * 12/2012 Keidel .................. F01N 3/36
123/470
8,495,986 B2 * 7/2013 Reba .................... B23P 6/00
123/470

(Continued)

FOREIGN PATENT DOCUMENTS

DE       10312212 A1    11/2003
DE    102007031817 A1    1/2009
(Continued)

OTHER PUBLICATIONS

European Search Report, dated May 23, 2019 for counterpart EP patent application 19164094.5.

*Primary Examiner* — Binh Q Tran

(57) ABSTRACT

A heat shield for a reductant delivery unit (RDU), the RDU including a fluid injector with a fluid inlet and a fluid outlet, and a clamp flange for attachment to a mounting boss of a vehicle exhaust pipe. The heat shield includes a first portion which is attached to the fluid injector so as to at least partly cover the fluid outlet thereof. The first portion serves as a thermal barrier for the fluid injector and a mechanical barrier for preventing particles in the vehicle exhaust pipe from contacting the fluid injector when the RDU is attached to the vehicle exhaust pipe. The heat shield further includes a second portion which extends radially outwardly from the first portion for sealing the attachment between the clamp flange and the mounting boss of the vehicle exhaust pipe when the RDU is attached thereto.

18 Claims, 4 Drawing Sheets

(52) U.S. Cl.
CPC ............. *F01N 2610/146* (2013.01); *F01N 2610/1453* (2013.01); *F01N 2900/1821* (2013.01)

(56) References Cited

U.S. PATENT DOCUMENTS

| | | | | |
|---|---|---|---|---|
| 8,998,114 B2* | 4/2015 | Olivier | ............... | F01N 3/2066 239/585.1 |
| 9,003,775 B2* | 4/2015 | Wright | ............... | F01N 3/2066 239/533.2 |
| 9,366,169 B2* | 6/2016 | Pohl | ............... | F01N 3/2066 |
| 9,745,880 B2* | 8/2017 | Haeberer | ............... | F01N 3/2066 |
| 2012/0110990 A1 | 5/2012 | Stein et al. | | |
| 2014/0054394 A1* | 2/2014 | Bugos | ............... | F01N 3/10 239/132.3 |
| 2015/0093302 A1 | 4/2015 | Pohl et al. | | |
| 2016/0305298 A1* | 10/2016 | Murst | ............... | F01N 3/2066 |

FOREIGN PATENT DOCUMENTS

| | | |
|---|---|---|
| DE | 102011075591 A1 | 11/2012 |
| DE | 102012202139 A1 | 8/2013 |
| WO | 2005005799 A1 | 1/2005 |
| WO | 2012138373 A1 | 10/2012 |

\* cited by examiner

HEAT SHIELD AND GASKET FOR REDUCTANT DELIVERY UNIT

TECHNICAL FIELD

This application relates generally to exhaust systems and, more specifically, to exhaust aftertreatment systems.

BACKGROUND OF THE INVENTION

Stringent emissions standards in Europe and North America are requiring automakers to reduce emissions produced by vehicles. Various technologies have been developed to reduce these emissions.

For instance, some diesel engines exhibit high levels of nitrogen oxide (NOx) emissions. Selective catalytic reduction (SCR) approaches have been used to convert nitrogen oxides into nitrogen, $N_2$, and water, $H_2O$.

In SCR approaches, a reduction delivery unit (RDU) is used to inject a Diesel Exhaust Fluid (DEF) reductant into the exhaust stream of an engine. For example, urea is added to the exhaust gas stream by the RDU and various byproducts such as carbon dioxide and water are formed. Ammonia is a desired bi-product and in conjunction with a catalyst converts the nitrogen oxide (NOx) into harmless water and nitrogen.

The RDU has a fluid injector that is in some cases liquid cooled by a liquid jacket. A conventional RDU fluid injector has a fluid outlet which extends into or is otherwise exposed to the flow path for the engine's exhaust in the exhaust pipe. The liquid jacket of a conventional liquid-cooled RDU is also exposed to flow path of the engine's exhaust. The relatively high temperature of the engine exhaust has been seen to adversely affect the RDU fluid injector and the operation thereof. The temperature gradient between the exhaust gases, mounting flanges and the RDU has been known to accelerate the formation of deposits that affect spray quality, thus affecting the ability to convert nitrogen oxides into $N_2$ and $H_2O$.

SUMMARY

According to an example embodiment, there is disclosed an RDU including a fluid injector having a fluid inlet, a fluid outlet and a fluid flow path providing fluid communication between the fluid inlet and the fluid outlet. The fluid injector further includes a valve, the valve controlling the flow of fluid through the fluid injector and including a valve body, the valve body having a distal end at which the fluid outlet is disposed. The fluid injector is disposed in a housing of the RDU. A clamp flange is coupled to the housing and configured to engage with a mounting boss of a vehicle exhaust pipe. The RDU further includes a shield member having a first portion which is disposed downstream of the fluid outlet, relative to a direction of fluid flow in the fluid injector, and at least partly covers the fluid outlet, and a second portion which is disposed adjacent to and contacts the clamp flange and seals the engagement between the clamp flange and the mounting boss of the vehicle exhaust pipe when the RDU is mounted thereto.

In an example embodiment, the first portion of the shield member has a side wall which extends generally in a longitudinal direction of the fluid injector, and an end wall connected to and extending from a first axial end of the side wall towards a longitudinal axis of the fluid injector. The end wall has a radially central opening that is dimensioned for allowing fluid exiting the fluid outlet to pass through the shield member.

In an example embodiment, the second portion extends from a second axial end of the side wall in direction that is at a predetermined angle with the side wall. The second portion forms a seal when the second portion is disposed between the clamp flange and the mounting boss of the vehicle exhaust pipe and the RDU is mounted to the vehicle exhaust pipe. The second portion may include a protrusion which extends from a surface of the second portion and is compressible.

In an example embodiment, at least one of the first portion and the second portion includes a plurality of notches defined therethrough, the notches being evenly distributed around the at least one of the first portion and the second portion. Each notch may include a segment that is defined in the first portion so as to extend in the longitudinal direction of the fluid injector.

The end wall may include a flared end portion at the radially central opening. The flared end portion of the end wall flares axially outwardly, away from the fluid outlet of the fluid injector, or inwardly towards the fluid outlet of the fluid injector. In the case of the flared end portion flares inwardly, a distal edge of the flared end portion of the end wall is adjacent the distal end of the valve body.

In an example embodiment, the first portion includes a first cylindrical segment and a second cylindrical segment disposed between the first cylindrical segment and the second portion. An outer diameter of the first cylindrical segment may be unequal to an outer diameter of the second cylindrical segment.

The first portion and the second portion of the shield member may be integrally formed as a unitary member.

In another example embodiment, there is disclosed heat shield for an RDU, the RDU including a fluid injector with a fluid inlet and a fluid outlet, and a clamp flange for attachment to a mounting boss of a vehicle exhaust pipe. The heat shield includes a first portion for attachment to the clamp flange so as to at least partly cover the fluid outlet thereof, the first portion serving as a thermal barrier for the fluid injector and a mechanical barrier for preventing particles in the vehicle exhaust pipe from contacting the fluid injector when the RDU is attached to the vehicle exhaust pipe. The heat shield further includes a second portion which extends radially outwardly from the first portion for sealing the attachment between the clamp flange and the mounting boss of the vehicle exhaust pipe when the RDU is attached thereto, the first and second portion being integrally formed as a unitary member.

The first portion of the shield member has a side wall and an end wall connected to and extending from a first axial end of the side wall towards a longitudinal axis of the fluid injector when the heat shield is attached to the clamp flange. The end wall has a radially central opening that is dimensioned for allowing fluid exiting the fluid outlet to pass through the shield member when the heat shield is attached to the clamp flange. The second portion extends from a second axial end of the side wall in direction that is at a predetermined angle with the side wall, the second portion forming a seal when the second portion is disposed between the clamp flange and the mounting boss of the vehicle exhaust pipe and the reductant delivery unit is mounted to the vehicle exhaust pipe. The second portion includes a compressible protrusion which extends from a surface of the second portion. At least one of the first portion and the second portion includes a plurality of notches defined therethrough, the notches being evenly distributed around the at least one of the first portion and the second portion. The end wall includes a radial end portion which flares in an axial direction.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Example embodiments are generally directed to a heat shield for an RDU fluid injector which includes a flange or lip for positioning within the attachment arrangement for mounting the RDU to a vehicle exhaust pipe, so as to serve as a gasket for sealingly preventing exhaust gas and/or liquids in the vehicle exhaust pipe from escaping the vehicle exhaust system at the RDU attachment. By being positioned between the fluid outlet of the RDU fluid injector and the vehicle exhaust pipe, the heat shield serves as a thermal barrier. The heat shield also serves as a high temperature mechanical barrier by preventing reductant droplets, injected into the vehicle exhaust pipe from the RDU fluid injector, from recirculating and collecting on the RDU fluid injector, drying and forming deposits which, over time, may adversely affect the spray quality of the RDU fluid injector.

Figure 1:
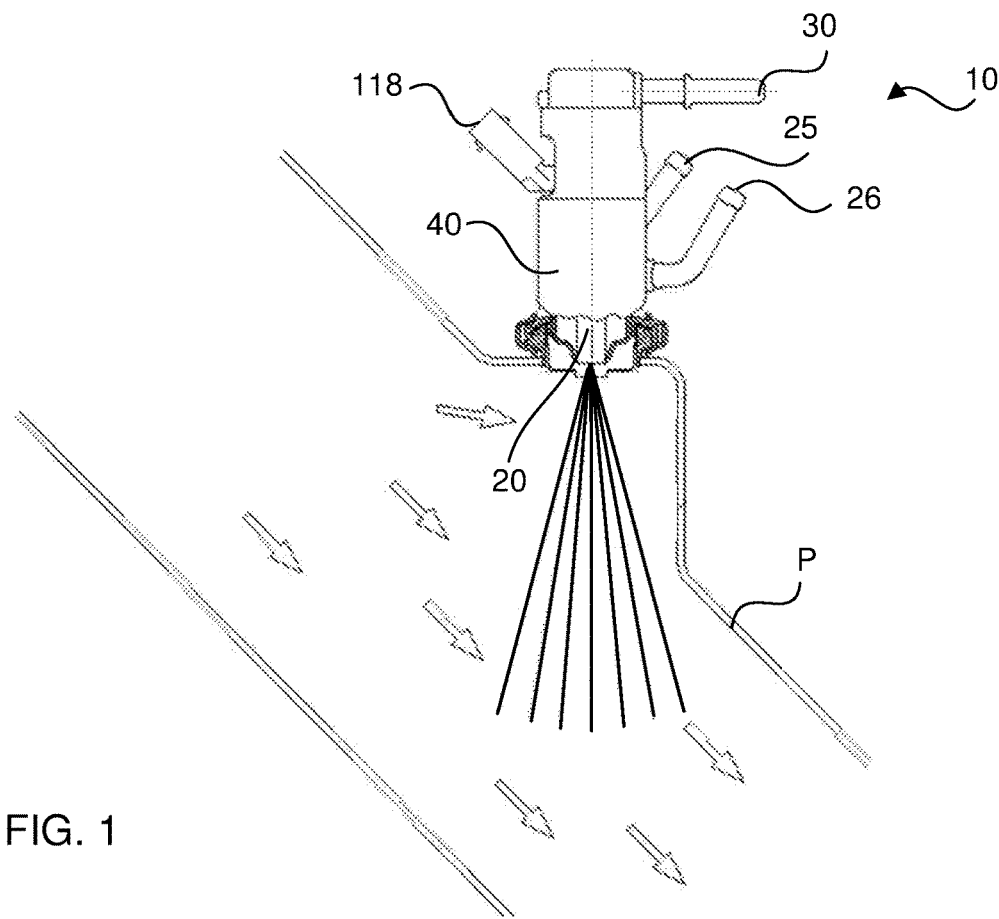
FIG. 1 is a diagram of a liquid cooled SCR RDU mounted to a vehicle exhaust pipe according to an example embodiment.

Referring now to FIG. 1, there is shown an SCR RDU 10 mounted to a vehicle exhaust pipe P. Exhaust gasses and liquids from the vehicle's engine (not shown) travel along vehicle exhaust pipe P from the engine as depicted by the arrows appearing in pipe P. RDU 10 injects reductant into exhaust pipe P in doses so as to reduce the levels of nitrogen oxide (NOx) emissions as part of an SCR process.

As shown in FIG. 1, RDU 10 includes a fluid inlet 30 which supplies the reductant to RDU 10. Fluid inlet 30 is connectable to a supply of reductant.

RDU 10 further includes a fluid injector 20 which is disposed within RDU housing 40. Fluid injector 20, which is shown in the partial cutaway of RDU housing 40 in FIG. 1, includes components conventionally found in RDU injectors. Specifically, fluid injector 20 may include a fluid inlet, a fluid outlet and a fluid flow path providing fluid communication therebetween. Fluid injector 20 may further include a valve and an actuator unit (not shown) operatively coupled to the valve. In response to an electrical signal received at electrical connector 118 and provided to the actuator unit, the valve is caused to switch between a closed state in which reductant is prevented from flowing through fluid injector 20 and being injected into exhaust pipe P, and an open state in which reductant in fluid injector 20 is discharged therefrom and injected into exhaust pipe P. Because components found in conventional fluid injectors are well known, a detailed description of the injector components will not be included for reasons of expediency.

Figure 2:
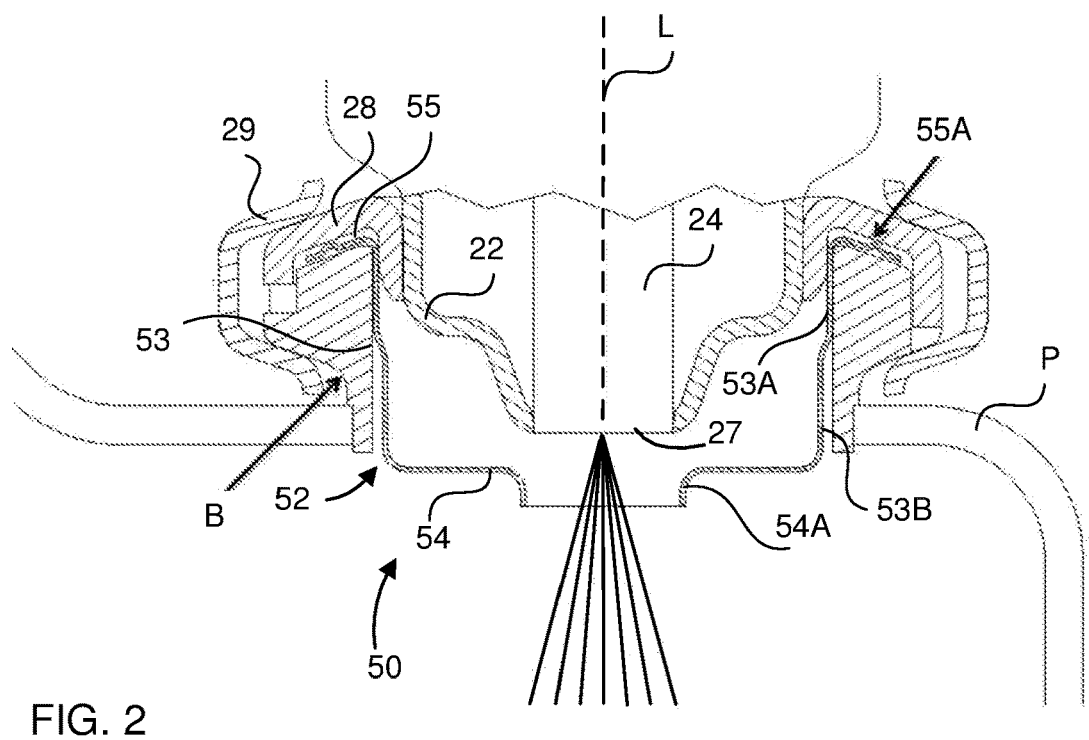
FIG. 2 is a cross sectional view of a downstream portion of the RDU of FIG. 1 according to an example embodiment.

FIG. 2 illustrates the downstream end of RDU 10, relative to a direction of fluid (reductant) flow through RDU 10, according to an example embodiment. Fluid injector 20 includes a fluid outlet 27 disposed at the distal, downstream end of a valve body 24 of the injector valve. In the illustrated embodiment, RDU 10 is a liquid-cooled RDU and includes a coolant jacket 22 which surrounds valve body 24 of the valve (and/or other parts) of fluid injector 20 so as to define a closed space therebetween. Coolant is supplied to the closed space from a coolant source via coolant inlet 25 and is recirculated back to the coolant source via coolant outlet 26 (FIG. 1). Coolant passing around at least the downstream end of fluid injector 20 assists in keeping elevated temperatures of the vehicle exhaust pipe P from damaging or otherwise adversely affecting the performance of fluid injector 20.

RDU 10 further includes a clamp flange 28, which is attached to coolant jacket 22 and/or RDU housing 40 in the present embodiment. Clamp flange 28 engages with a mounting boss B of vehicle exhaust pipe P using clamp member 29 for stably mounting RDU 10 to exhaust pipe 9.

As shown in FIG. 2, RDU 10 additionally includes a shield member 50 which is generally disposed between the downstream end of fluid injector 20 and vehicle exhaust pipe P. Shield member 50 includes a first portion 52 and a second portion 55. In an example embodiment, first portion 52 and second portion 55 are integrally formed as a unitary member such that shield member 50 is a one-piece component of RDU 10. In an example embodiment, shield member 50 is constructed from a metal and/or a metal composition.

Figure 3:
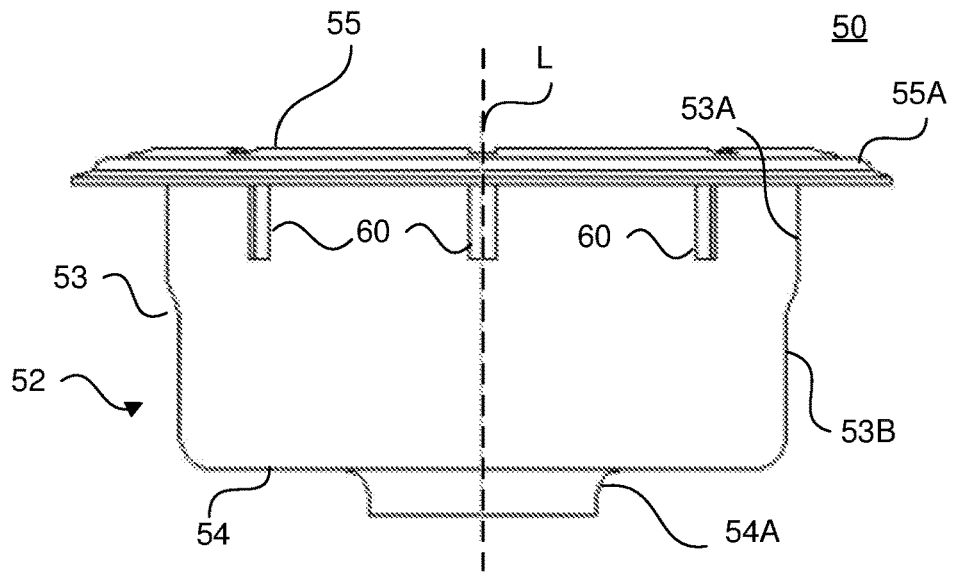
FIG. 3 is a side elevational view of a shield member of the RDU of FIG. 1.

As shown in FIG. 2, first portion 52 at least partly covers fluid outlet 27 and a downstream end of coolant jacket 22. First portion 52 is largely cup shaped, having a side wall 53 and an end wall 54. As illustrated in FIGS. 2 and 3, side wall 53 is generally shaped as one or more stacked cylinder segments, including a first cylinder segment 53A and a second cylinder segment 53B. First cylinder segment 53A may have an inner diameter and an outer diameter that are greater than inner and outer diameters, respectively, of second cylinder segment 53B. It is understood, however, that first and second cylinder segments 53A, 53B may have the same or different inner and outer diameters. At least a portion of side wall 53, such as first cylinder segment 53A, has an outer surface which contacts an inner surface of mounting boss B of vehicle exhaust pipe P, and an inner surface which contacts an outwardly facing surface of flange 28, as shown in FIG. 2. The contact with flange 28 may result in a press-fit attachment between shield member 50 and flange 28, as discussed in greater detail below.

End wall 54 extends from the downstream, axial and/or distal end of side wall 53 towards the longitudinal axis L of fluid injector 20. In the embodiment illustrated in FIGS. 2-5, end wall 54 extends in a radially inward direction from the distal end of side wall 53 so as to be generally orthogonal to side wall 53. It is understood, however, that end wall 54 may extend towards longitudinal axis L differently so that end wall 54 forms an acute or obtuse angle with side wall 53, for example.

In the example embodiments, end wall 54 includes an opening or aperture defined in a radially central portion of end wall 54. The opening is sized and dimensioned so that doses of reductant discharged from fluid injector 20 are able to pass through the opening and be injected into exhaust pipe P. As shown in FIGS. 2 and 3, end wall 54 includes a flared portion 54A which flares outwardly and away from the distal end of valve body 24 and into exhaust pipe P. Flared portion 54A is illustrated as bending from the rest of end wall 54 to such an extent that the distal end region of flared portion 54A is orthogonal thereto. It is understood, however, that the extent of the flare of flared portion 54A may be more or less than the amount of flare depicted in FIGS. 2 and 3.

Figure 3A:
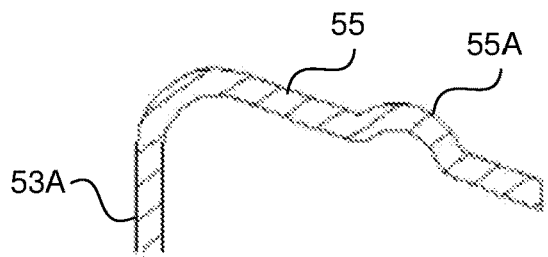
FIG. 3A is an expanded cross-sectional view of a portion of the shield member of FIG. 3.

With reference to FIGS. 2-5, second portion 55 of shield member 50 extends from first portion 52 for engagement within the mounting assembly for mounting RDU 10 to vehicle exhaust pipe P. Specifically, second portion 55 extends from the upstream, axial end of first portion 52 in a generally radially outward direction so as to form a lip or flange. As shown in FIG. 2 and an expanded view in FIG. 3A, second portion 55 forms an acute angle with first portion 52 connected thereto. It is understood, however, that second portion 55 and first portion 52 may form a different angle, such as a right angle or an obtuse angle, depending upon the particular mounting assembly for RDU 10. The extent to which second portion 55 extends radially from first portion 52 may similarly depend upon the particular mounting assembly for RDU 10.

Shield member 50, and particularly second portion 52 thereof, is sized and dimensioned for being placed between flange 28 of RDU 10 and the exhaust mounting boss B, as shown in FIG. 2. This results in shield member 50 being clamped and otherwise fixed in place relative to fluid injector 20 and exhaust pipe P when RDU 10 is mounted thereto.

Referring again to FIGS. 2-5, second portion 55 includes a protrusion 55A which forms an endless feature and/or loop along second portion 55. In the illustrated example embodiment, protrusion 55A protrudes in a direction away from exhaust mounting boss B and towards flange 28 when RDU 10 is mounted to exhaust pipe P, but it is understood that protrusion 55A may protrude in a direction towards mounting boss B and away from flange 28. In the example embodiment, protrusion 55A is compressible, and particularly resiliently compressible. Protrusion 55A being compressible results in second portion 55 serving as a gasket or seal to prevent exhaust fluids in vehicle exhaust pipe P from exiting pipe P through the mounting assembly for RDU 10.

Figure 4:
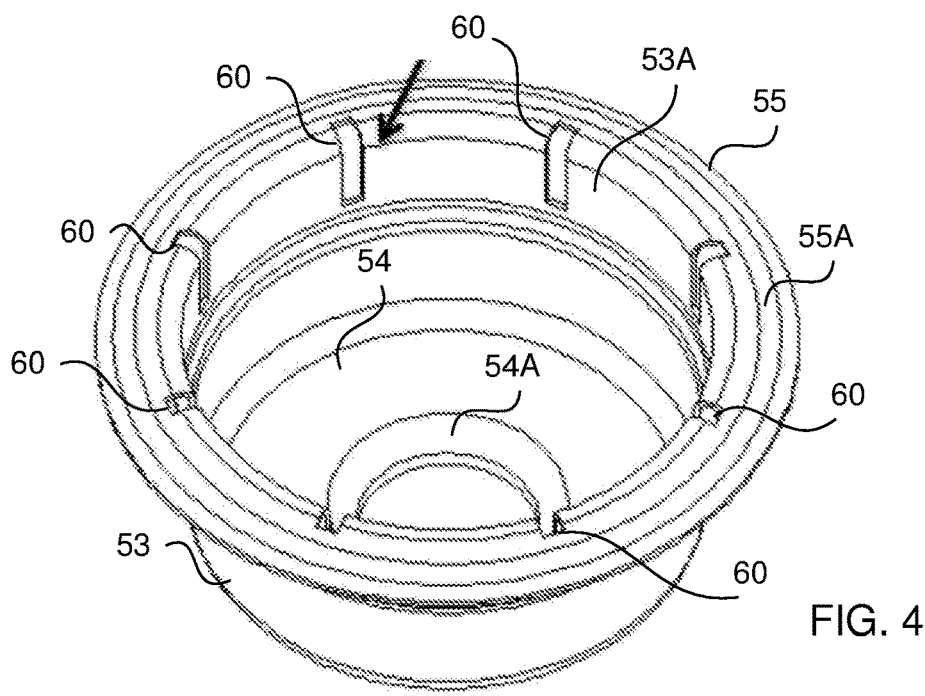
FIG. 4 is a perspective view of the shield member of FIG. 3.
Figure 5:
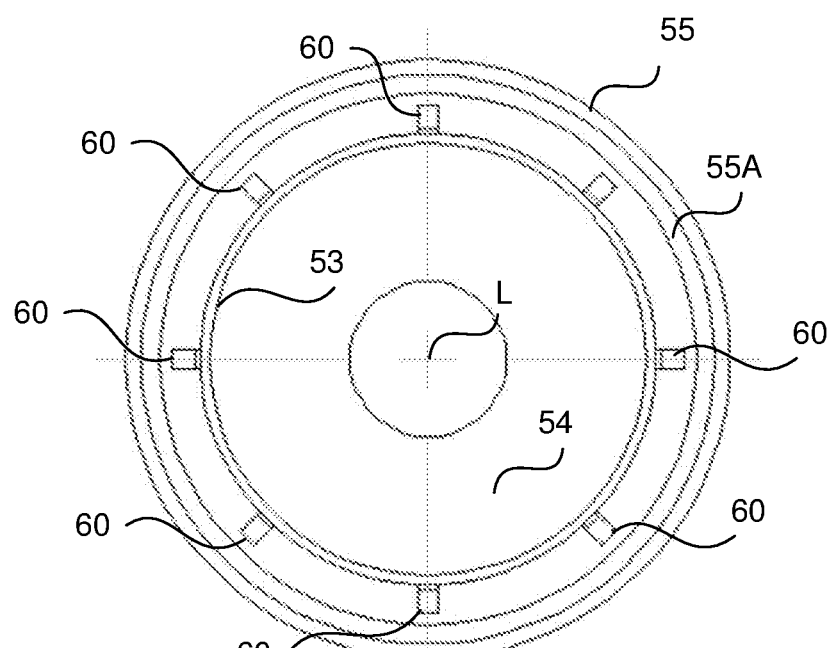
FIG. 5 is a top plan view of the shield member of FIG. 3.

With continued reference to FIGS. 3-5, first portion 52 and second portion 55 of shield member 50 include a plurality of notches 60 defined therethrough. Notches 60 may be evenly or nearly evenly distributed circumferentially around first portion 52 and second portion 55. A segment of each notch 60 defined through first portion 52 is largely parallel with longitudinal axis L of fluid injector 20. It is understood, however, that each such segment of notch 60 may be defined in a different direction. Another segment of each notch 60 is defined through second portion 55 and extends in a largely radial direction. During assembly of RDU 10 and/or during mounting of RDU 10 to vehicle exhaust boss B, notches 60 allow expansion of first portion 52 and second portion 55 when fitting first portion 52 over flange 28 in a press-fit engagement therewith.

Figure 6:
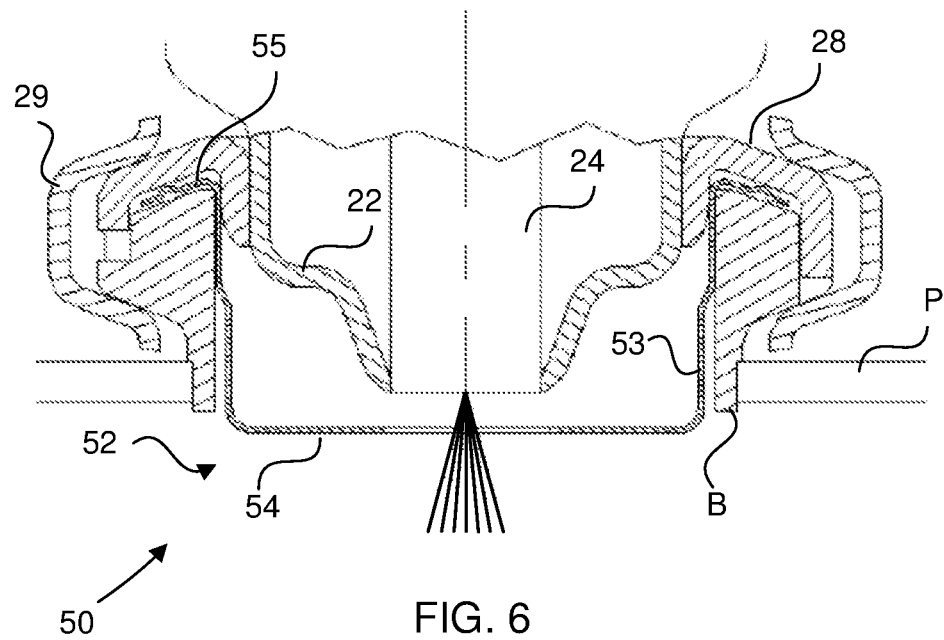
FIG. 6 is a is a cross sectional view of a downstream portion of the RDU of FIG. 1 according to another example embodiment.
Figure 7:
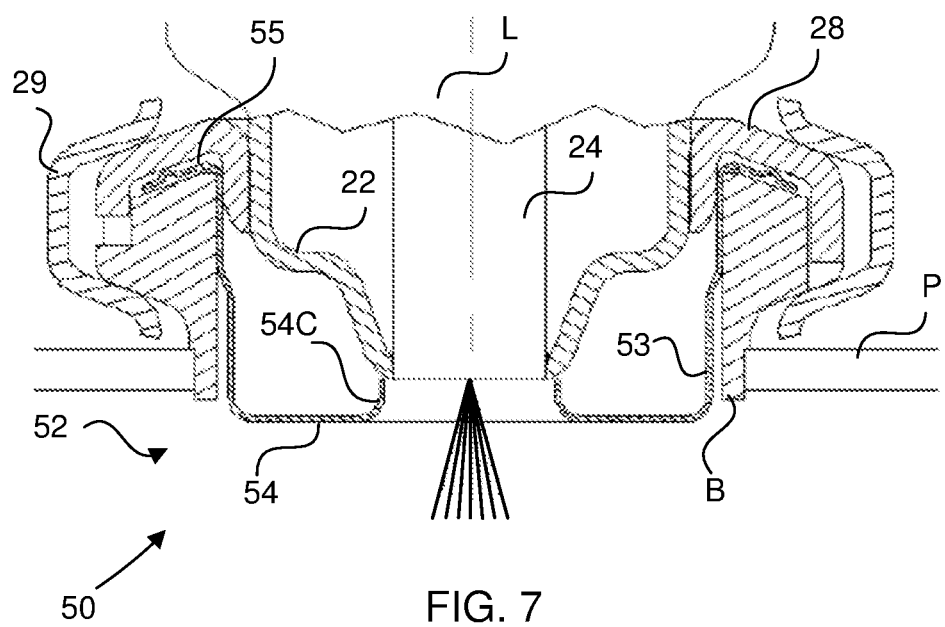
FIG. 7 is a cross sectional view of a downstream portion of the RDU of FIG. 1 according to yet another example embodiment.

FIGS. 2 and 3 illustrate end wall 54 of shield member 50 having an outwardly (and/or downwardly, relative to the flow of reductant through fluid injector 20) flared portion. FIG. 6 illustrates shield member 50 according to another embodiment in which end wall 54 has no flared end defining the central opening. In this embodiment, end wall 54 may be planar or nearly planar and have a largely annular shape. FIG. 7 illustrates yet another embodiment in which end wall 54 includes a flared portion 54C which flares inwardly, toward the distal end of valve body 24 and away from exhaust pipe P. Flared portion 54C is illustrated as bending from the rest of end wall 54 to such an extent that the distal end region of flared portion 54A is orthogonal thereto. It is understood, however, that the extent of the flare of flared portion 54C may be more or less than the amount of the flare depicted in FIG. 7. The distal end of flared portion 54C may contact the end of coolant jacket 22 and/or the distal end of valve body 24, but it is understood that flared portion 54C may alternatively be spaced therefrom.

With RDU 10 installed on and/or mounted to vehicle exhaust pipe P, second portion 55 of shield member 50 is secured between clamp flange 28 and exhaust mounting boss B so as to be clamped thereto and in a fixed position relative to fluid outlet 27 of fluid injector 20. As mentioned above, compressible protrusion 55A results in second portion 55 serving as a gasket or seal, preventing fluids in exhaust pipe P from flowing between mounting boss B and RDU 10. In addition, due to it occupying an area between fluid injector 20 and heated fluids passing through exhaust pipe P, first portion 52 of shield member 50 acts as a thermal barrier for coolant jacket 22.

Figure 8:
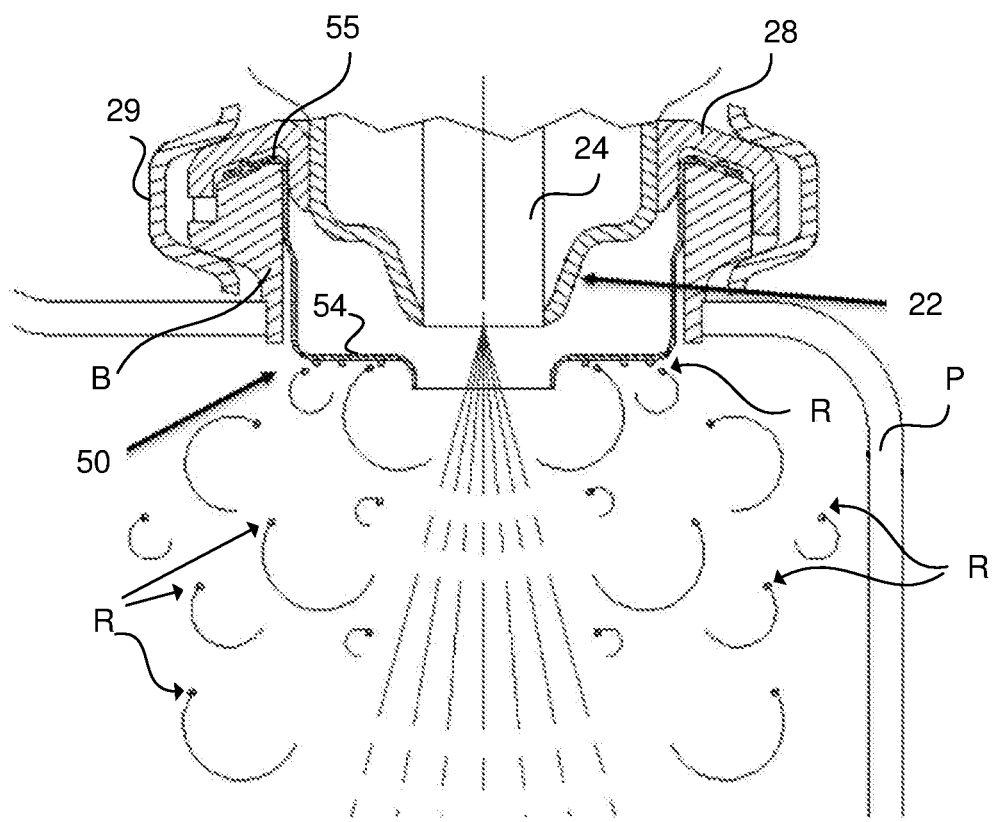
FIG. 8 is a cross sectional view of the downstream portion of the RDU of FIG. 1 showing a droplet flow pattern therefrom.

Shield member 50 further acts as a high temperature mechanical barrier. Specifically, because the surface temperature of the first portion 52 of shield member 50 approximately matches the temperature of the exhaust environment within vehicle exhaust pipe P, any recirculating reductant droplets that make contact with the first portion 52, following injection into pipe P from fluid injector 20, rapidly evaporate. FIG. 8 depicts a spray dose of reductant from RDU 10 in which some droplets R from the spray are influenced by eddy currents and/or turbulence factors in vehicle exhaust pipe P and are directed back toward RDU 10. Without end wall 54 of shield member 50, injected reductant droplets R would make contact with the relatively cool RDU 10, including coolant jacket 22 and valve body 24. Since fluid injector 20 (approximately 90 degrees C.) is much cooler than shield member 50 (up to 600 degrees C.) during normal operation, reductant droplets would remain on fluid injector 20 in the absence of shield member 50, collect and form deposits on injector 20. Over time, the collected deposits would accumulate on fluid injector 20 and may potentially affect the spray quality thereof.

The one-piece shield member 50, which combines the function of a gasket or seal within the mounting assembly of RDU 10 with the function(s) of a thermal barrier and high temperature mechanical barrier, provides a manufacturing-simplified shield member which is rigidly attached during installation and/or mounting of RDU 10 to exhaust pipe P.

Example embodiments described above show RDU 10 as being a liquid-cooled RDU. It is understood that RDU 10 may be an air-cooled RDU in which airflow paths through RDU housing 40 facilitate temperature control of fluid injector 20.

Example embodiments of this invention are described herein, including the best mode known to the inventors for carrying out the invention. It should be understood that the illustrated embodiments are exemplary only, and should not be taken as limiting the scope of the invention.

What is claimed is:

1. A reductant delivery unit, comprising:
    a fluid injector having a fluid inlet, a fluid outlet and a fluid flow path providing fluid communication between the fluid inlet and the fluid outlet, the fluid injector further comprising a valve, the valve controlling the flow of fluid through the fluid injector and including a valve body, the valve body having a distal end at which the fluid outlet is disposed;
    a housing in which the fluid injector is disposed;
    a clamp flange coupled to the housing and configured to engage with a mounting boss of a vehicle exhaust pipe; and
    a shield member having a first portion which is disposed downstream of the fluid outlet, relative to a direction of fluid flow in the fluid injector, and at least partly covers the fluid outlet, and a second portion which is disposed adjacent to and contacts the clamp flange and seals the engagement between the clamp flange and the mounting boss of the vehicle exhaust pipe when the reductant delivery unit is mounted thereto.

2. The reductant delivery unit of claim 1, wherein the first portion of the shield member has a side wall which extends generally in a longitudinal direction of the fluid injector, and an end wall connected to and extending from a first axial end of the side wall towards a longitudinal axis of the fluid injector, the end wall having a radially central opening that is dimensioned for allowing fluid exiting the fluid outlet to pass through the shield member.

3. The reductant delivery unit of claim 2, wherein the second portion extends from a second axial end of the side wall in direction that is at a predetermined angle with the side wall, the second portion forming a seal when the second portion is disposed between the clamp flange and the mounting boss of the vehicle exhaust pipe and the reductant delivery unit is mounted to the vehicle exhaust pipe.

4. The reductant delivery unit of claim 3, wherein the second portion comprises a protrusion which extends from a surface of the second portion, the protrusion being compressible.

5. The reductant delivery unit of claim 3, wherein at least one of the first portion and the second portion includes a plurality of notches defined therethrough, the notches being evenly distributed around the at least one of the first portion and the second portion.

6. The reductant delivery unit of claim 5, wherein each notch includes a segment that is defined in the first portion so as to extend in the longitudinal direction of the fluid injector.

7. The reductant delivery unit of claim 2, wherein the end wall includes a flared end portion at the radially central opening.

8. The reductant delivery unit of claim 7, wherein the flared end portion of the end wall flares axially outwardly, away from the fluid outlet of the fluid injector.

9. The reductant delivery unit of claim 7, wherein the flared end portion of the end wall flares inwardly towards the fluid outlet of the fluid injector.

10. The reductant delivery unit of claim 9, wherein a distal edge of the flared end portion of the end wall is adjacent the distal end of the valve body.

11. The reductant delivery unit of claim 2, wherein the first portion includes a first cylindrical segment and a second cylindrical segment disposed between the first cylindrical segment and the second portion, an outer diameter of the first cylindrical segment being unequal to an outer diameter of the second cylindrical segment.

12. The reductant delivery unit of claim 1, wherein the first portion and the second portion of the shield member are integrally formed as a unitary member.

13. A heat shield for a reductant delivery unit (RDU), the RDU including a fluid injector with a fluid inlet and a fluid outlet, and a clamp flange for attachment to a mounting boss of a vehicle exhaust pipe, the heat shield comprising:
    a first portion for attachment to the clamp flange so as to at least partly cover the fluid outlet thereof, the first portion serving as a thermal barrier for the fluid injector and a mechanical barrier for preventing particles in the vehicle exhaust pipe from contacting the fluid injector when the RDU is attached to the vehicle exhaust pipe; and
    a second portion which extends radially outwardly from the first portion for sealing the attachment between the clamp flange and the mounting boss of the vehicle exhaust pipe when the RDU is attached thereto, the first and second portion being integrally formed as a unitary member.

14. The heat shield of claim 13, wherein the first portion of the shield member has a side wall and an end wall connected to and extending from a first axial end of the side wall towards a longitudinal axis of the fluid injector when the heat shield is attached to the clamp flange, the end wall having a radially central opening that is dimensioned for allowing fluid exiting the fluid outlet to pass through the shield member when the heat shield is attached to the clamp flange.

15. The heat shield of claim 14, wherein the second portion extends from a second axial end of the side wall in direction that is at a predetermined angle with the side wall, the second portion forming a seal when the second portion is disposed between the clamp flange and the mounting boss of the vehicle exhaust pipe and the reductant delivery unit is mounted to the vehicle exhaust pipe.

16. The heat shield of claim 15, wherein the second portion comprises a protrusion which extends from a surface of the second portion, the protrusion being compressible.

17. The heat shield of claim 14, wherein at least one of the first portion and the second portion includes a plurality of notches defined therethrough, the notches being evenly distributed around the at least one of the first portion and the second portion.

18. The heat shield of claim 14, wherein the end wall includes a radial end portion which flares in an axial direction.

* * * * *